US007880431B2

(12) United States Patent
Rayl et al.

(10) Patent No.: US 7,880,431 B2
(45) Date of Patent: Feb. 1, 2011

(54) MULTIPLE INTERFACES FOR A RECHARGEABLE BATTERY PACK

(75) Inventors: Paul Andrew Rayl, Greenwood, IN (US); Eric M. Toblas, Carmel, IN (US)

(73) Assignee: Technuity, Inc., Indianapolis, IN (US)

( * ) Notice: Subject to any disclaimer, the term of this patent is extended or adjusted under 35 U.S.C. 154(b) by 628 days.

(21) Appl. No.: 11/891,819

(22) Filed: Aug. 13, 2007

(65) Prior Publication Data

US 2009/0045774 A1 Feb. 19, 2009

(51) Int. Cl.
*H02J 7/00* (2006.01)
(52) U.S. Cl. ...................... 320/114; 320/112
(58) Field of Classification Search ................ 320/106, 320/107, 110, 111, 112, 113, 114, 115; 429/97, 429/98, 99, 100
See application file for complete search history.

(56) References Cited

U.S. PATENT DOCUMENTS

| 3,539,898 | A | * | 11/1970 | Tolmie | 320/115 |
|---|---|---|---|---|---|
| 5,122,721 | A | * | 6/1992 | Okada et al. | 320/111 |
| 5,686,808 | A | * | 11/1997 | Lutz | 320/110 |
| 5,780,993 | A | * | 7/1998 | Tsang | 320/111 |
| 5,847,545 | A | * | 12/1998 | Chen et al. | 320/138 |
| 2005/0189905 | A1 | * | 9/2005 | Liang et al. | 320/107 |
| 2005/0231159 | A1 | * | 10/2005 | Jones et al. | 320/114 |
| 2006/0152193 | A1 | * | 7/2006 | Wang | 320/107 |
| 2007/0103113 | A1 | * | 5/2007 | Embrey et al. | 320/112 |
| 2007/0285053 | A1 | * | 12/2007 | Noguchi et al. | 320/114 |
| 2008/0007215 | A1 | * | 1/2008 | Hsieh | 320/114 |

* cited by examiner

*Primary Examiner*—Edward Tso
*Assistant Examiner*—M'Baye Diao
(74) *Attorney, Agent, or Firm*—Krieg DeVault LLP

(57) ABSTRACT

A battery pack for powering a portable electronic device is disclosed. The battery pack includes means for connecting the battery pack to the portable electronic device such that a main power terminal of the battery pack engages a main power input port of the portable electronic device. An auxiliary power output terminal is located on an outer surface of the portable electronic device that is capable of receiving a power cord for powering the portable electronic device through an auxiliary power input port located on the portable electronic device. A charger input terminal is also included on the outer surface of the battery pack for receiving the power cord for recharging the battery pack.

21 Claims, 5 Drawing Sheets

MULTIPLE INTERFACES FOR A RECHARGEABLE BATTERY PACK

BACKGROUND

The present invention relates generally to rechargeable batteries for portable electronic devices and, more particularly, to a rechargeable battery including multiple interfaces for charging the battery pack and powering a portable electronic device.

Portable electronic devices are typically powered by attaching a rechargeable battery or battery pack to a power connector located on the electronic device. The rechargeable battery houses power cells that hold a charge for a finite period of time. After the charge in the power cells has been depleted, the battery pack must be recharged for further use. The typical battery pack includes a connector that is used to connect the battery pack to the portable electronic device as well as a charger that is used to recharge the battery pack. Some battery packs will connect to multiple devices but may not power a respective device due to a variety of reasons.

SUMMARY

One embodiment of the present application discloses a battery pack that is designed to connect with and power a variety of devices. Other embodiments include unique apparatus, devices, systems, and methods for powering a plurality of portable electronic devices with a single battery pack. Further embodiments, forms, objects, features, advantages, aspects, and benefits of the present application shall become apparent from the detailed description and figures included herewith.

BRIEF DESCRIPTION OF THE DRAWINGS

The figures are not necessarily to scale, emphasis instead being placed upon illustrating the principles of the invention. Moreover, in the figures, like reference numerals designate corresponding parts throughout the different views.

DETAILED DESCRIPTION

Figure 1:
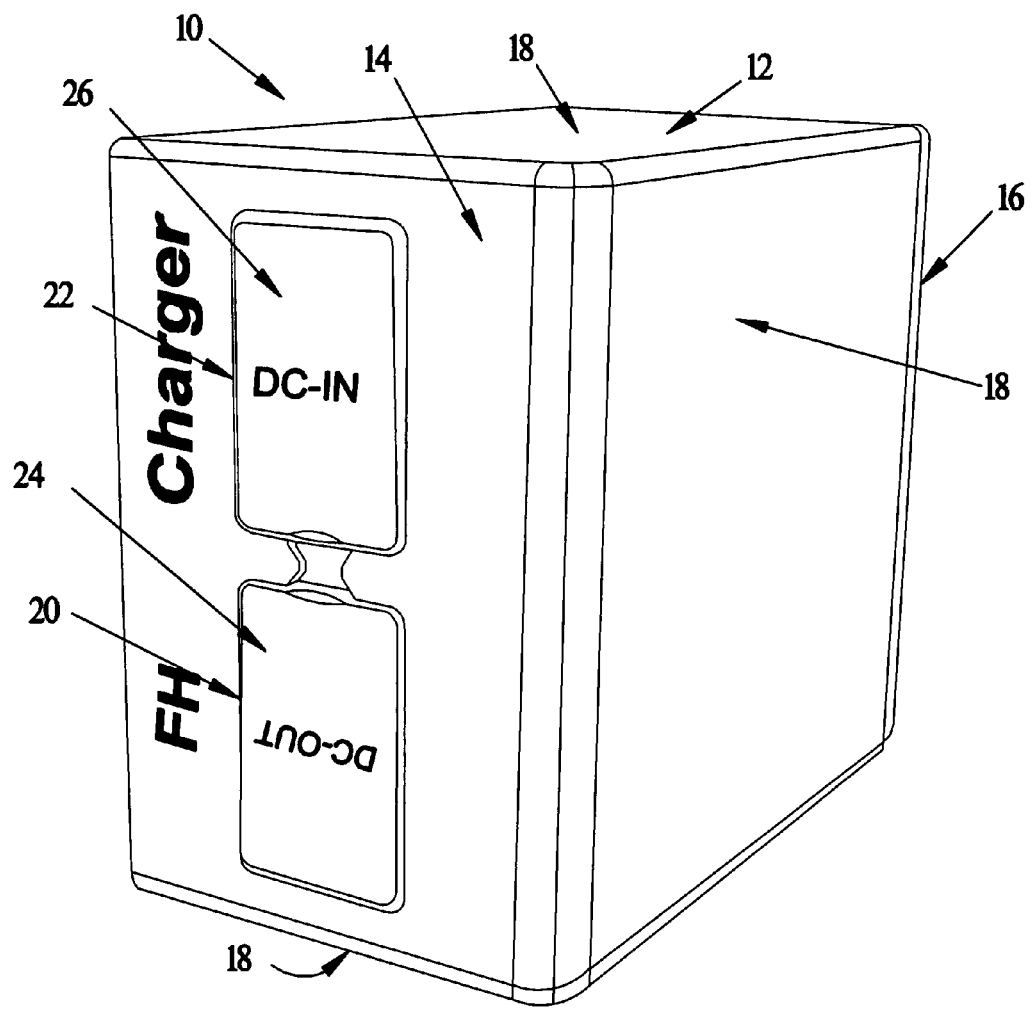
FIG. 1 is a front perspective view of a representative battery pack.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

Figure 2:
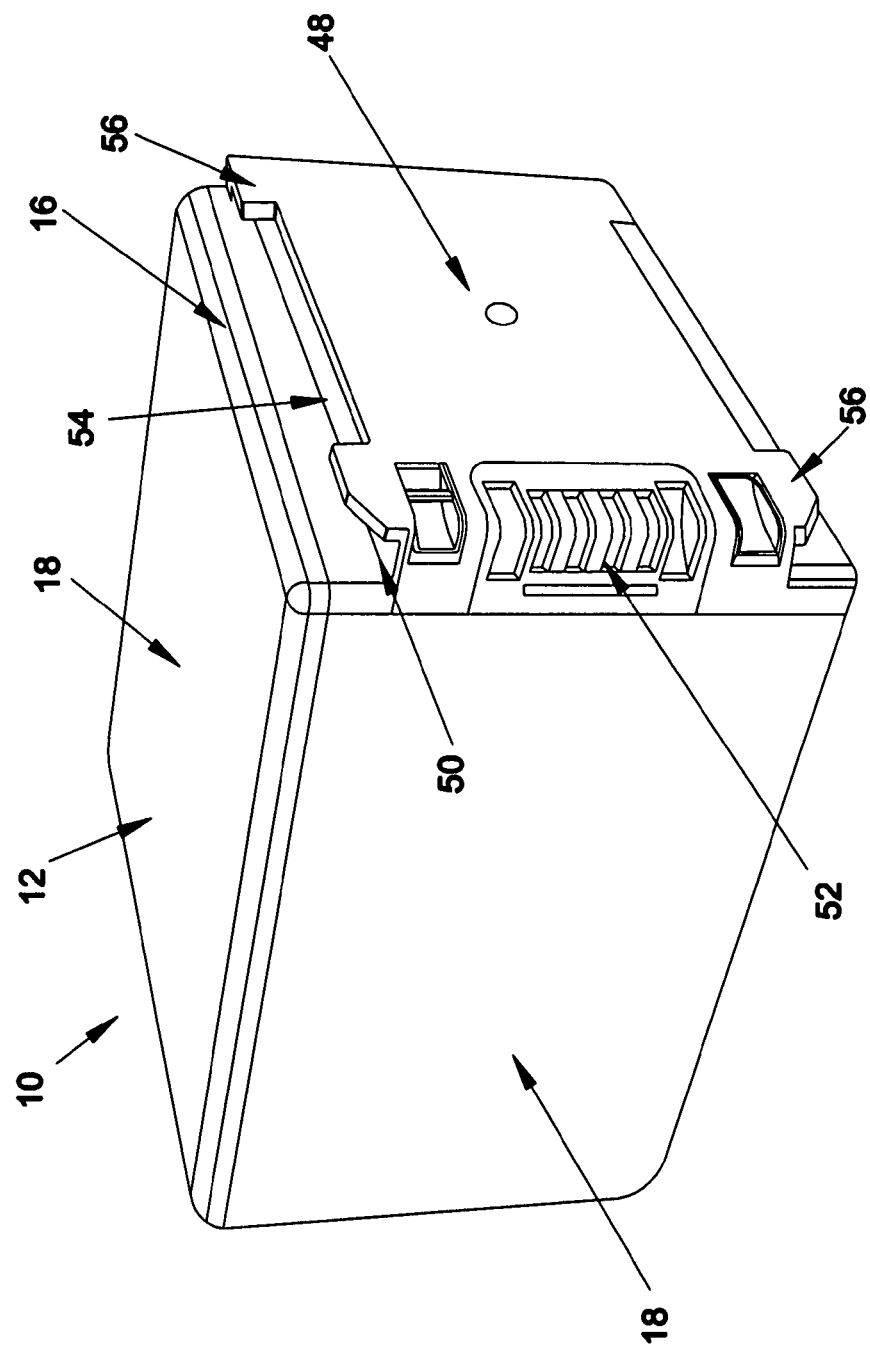
FIG. 2 is a back perspective view of the battery pack illustrated in FIG. 1.

Referring collectively to FIGS. 1 and 2, a rechargeable battery pack 10 is disclosed that includes multiple power interfaces that are used to power portable electronic devices and charge the battery pack. Battery pack 10 houses one or more rechargeable batteries such as, for example, lithium-ion batteries. Battery pack 10 includes a casing 12 that has a top surface 14, a bottom surface 16 and a plurality of side surfaces 18. Side surfaces 18 extend between top surface 14 and bottom surface 16 to form a generally rectangular shaped battery pack 10. Although battery pack 10 is illustrated as being generally rectangular in shape, other shaped battery packs are envisioned and hereby incorporated.

Figure 3:
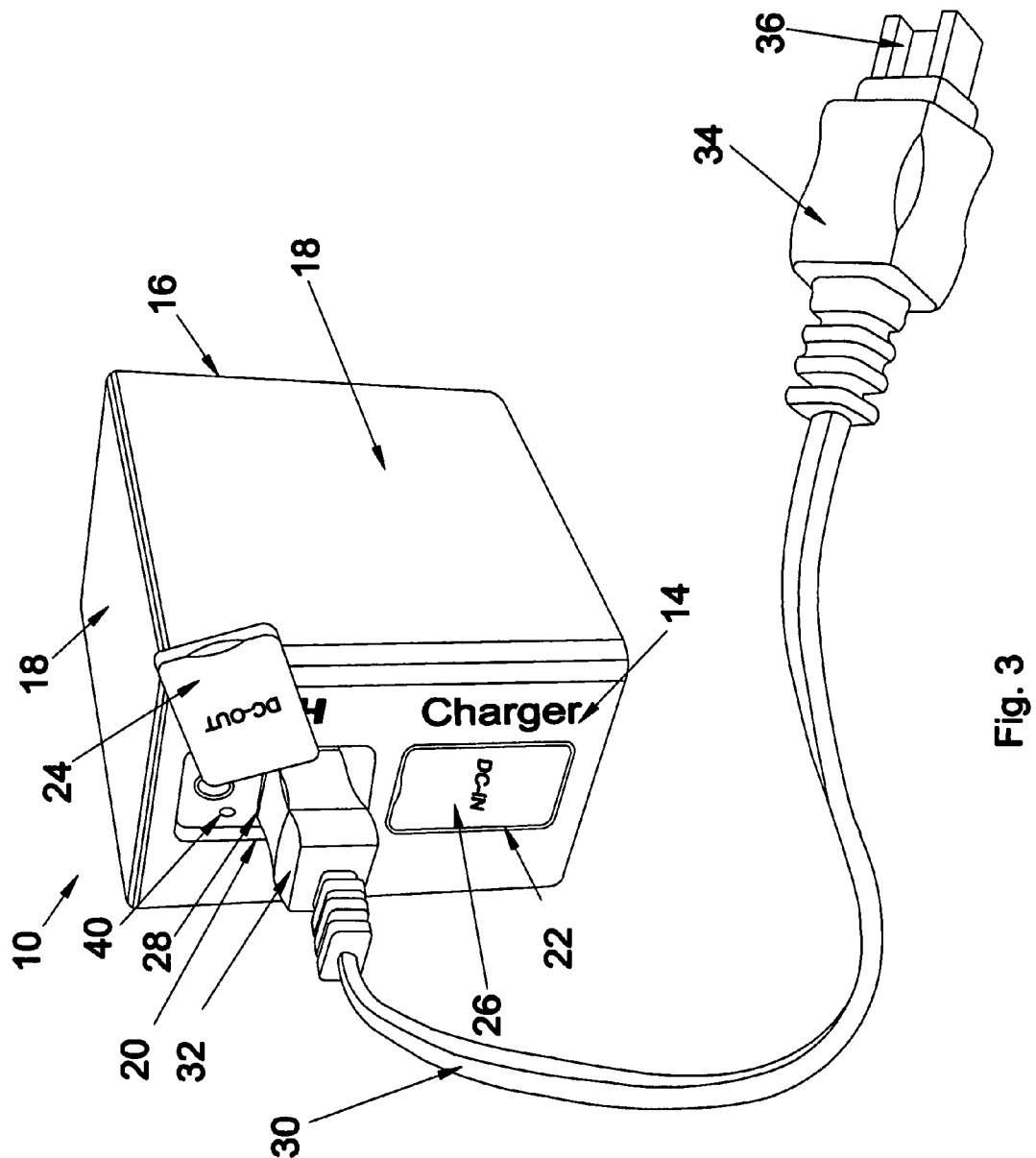
FIG. 3 is a view of the battery pack illustrated in FIG. 1 with a power cord connected thereto.

As illustrated in FIGS. 1 and 3, top surface 14 of battery pack 10 includes an auxiliary power output terminal 20 and a charger input terminal 22. Auxiliary power output terminal 20 and charger input terminal 22 are covered by rubber covers 24, 26 that, as illustrated in FIG. 3, open to expose connection ports 28 located under rubber covers 24, 26. Although connection terminal 28 for charger input terminal 22 is illustrated in FIG. 3 as being covered, it should be appreciated that the same connection port 28 used for auxiliary power output terminal 20 is used for charger input terminal 22.

As further illustrated in FIG. 3, a power cord 30 is included that includes a first plug 32 and a second plug 34 located at opposite ends of power cord 30. Each end of plugs 32, 34 include a conductive connector 36 that is configured to fit within connection ports 28 of auxiliary power output terminal 20 and charger input terminal 22. Each of conductive connector 36 allows power to flow through power cord 30. When power cord 30 is not in use, plugs 32, 34 are removed or disconnected from battery pack 10 and a portable electronic device. Covers 24, 26 may then be placed over auxiliary power output terminal 20 and/or charger input terminal 22.

An indicator or light emitting diode ("LED") 40 protrudes outwardly from a surface of auxiliary power output terminal 20 and charger input terminal 22, but may be located on other surfaces of casing 12. Although cover 26 is illustrated as covering the inside portion of charger input terminal 22, it should be appreciated that indicator 40 is oriented the same as that illustrated in relation to auxiliary power output terminal 20. As set forth in greater detail below, with respect to auxiliary power output terminal 20, if power is being supplied from auxiliary power output terminal 20, indicator 40 is illuminated in a steady state. If battery pack 10 has a low charge, indicator 40 is illuminated in a flashing state. With respect to charger input terminal 22, if battery pack 10 is being charged, indicator 40 is illuminated in a steady state and once battery pack 10 is fully charged, indicator 40 is either illuminated in a flashing state or turned off. Of course, the illumination of indicators 40 set forth above could be reversed in other forms of the present invention.

Referring back to FIG. 2, bottom surface 16 of battery pack 10 includes a loading surface 48 that includes at least one engagement member or segment 50 and a main power connection terminal 52. As set forth in greater detail below with respect to FIG. 4, engagement member 50 of loading surface 48 is used to temporarily connect battery pack 10 to a portable electronic device 70 such as, for example, a camcorder, a digital camera, a stereo, and so forth. Engagement member 50 includes guide recesses 54 located on opposing sides of engagement member 50. In addition, engagement member 50 includes a plurality of locking tabs 56 on opposing sides of engagement member 50. Guide recesses 54 are used to slide battery pack 10 in place on portable electronic device 70 and locking tabs 56 lock or secure battery pack 10 to portable electronic device 70.

Main power connection terminal 52 provides a power connection between battery pack 10 and certain portable electronic devices 70. Some portable electronic devices 70 are capable of utilizing main power connection terminal 52 for power and some are incompatible with main power connection terminal 52. For example, main power connection terminal 52 may not fit a mating power terminal of portable electronic device 70 or portable electronic device 70 may be programmed with software that prohibits certain battery packs 10 from being utilized in conjunction with portable electronic device 70. As set forth in detail below, if portable electronic device 70 is not capable of using main power connection terminal 52 of battery pack 10, then the owner of battery pack 10 can provide power or supply to portable electronic device 70 through the use of auxiliary power output terminal 20 and power cord 30.

Figure 4:
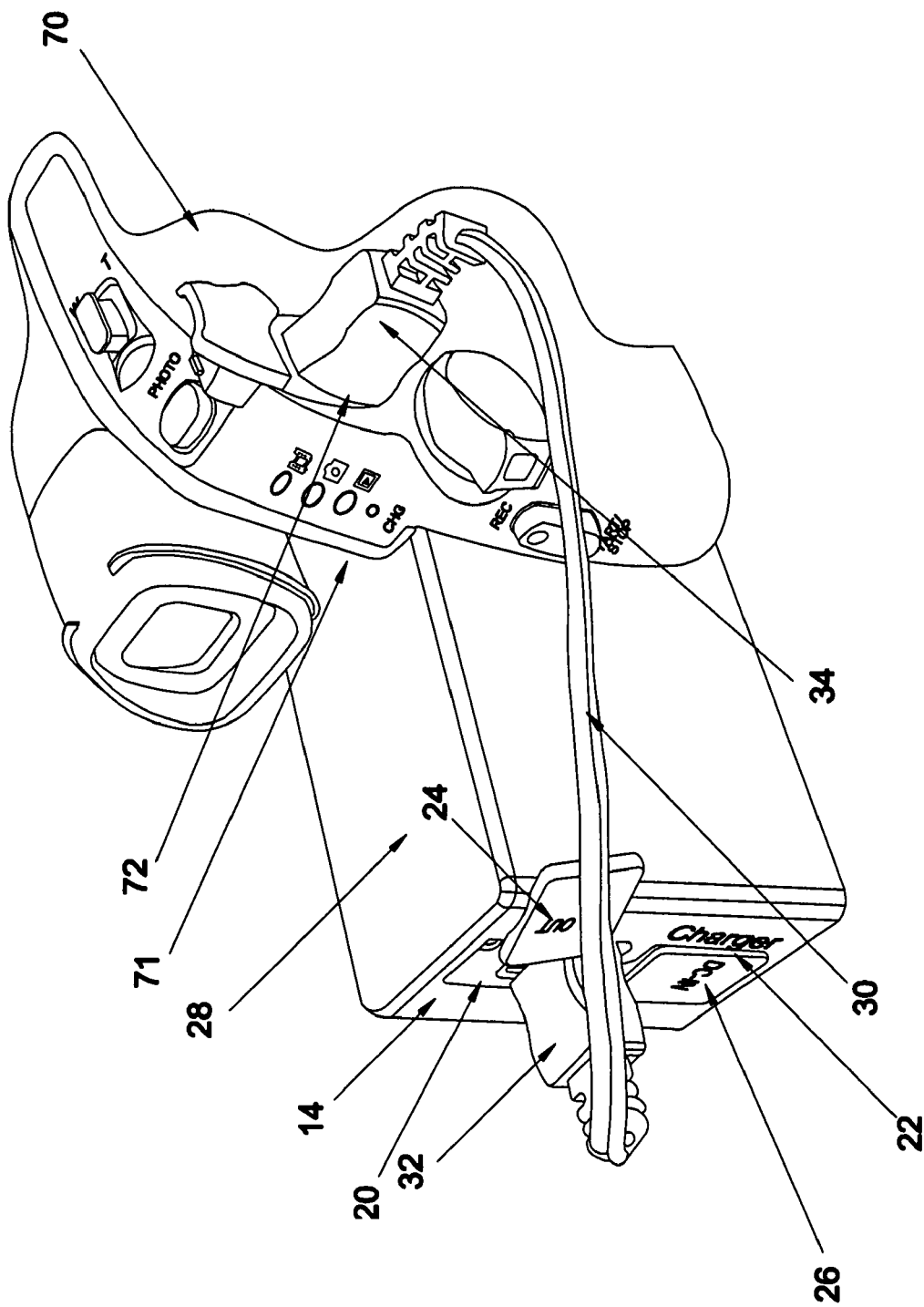
FIG. 4 is a perspective view of the battery pack connected with a portable electronic device.

Referring to FIG. 4, which illustrates battery pack 10 connected with portable electronic device 70, battery pack 10 is operable to provide power to portable electronic device 10 in one of two ways. For some portable electronic devices 70, main power connection terminal 52 of battery pack 10 is capable of providing or supplying power to portable electronic device 70. As such, use of power cord 30 is not required with respect to these portable electronic devices 70. Main power connection terminal 52 is capable of providing power to portable electronic device 70 by connecting with a mating power input terminal 71 located on portable electronic device 70.

As set forth above, other portable electronic devices 70 are not capable of operating through the use of main power connection terminal 52. However, as illustrated, battery pack 10 is still capable of being connected with portable electronic device 70. For these respective portable electronic devices 70, power must be supplied through the use of power cord 30.

In order to supply power to these portable electronic devices 70 through battery pack 10, cover 24 is opened to expose auxiliary power connection terminal 22. After auxiliary power connection terminal 22 is exposed, one plug 32, 34 of power cord 30 is inserted into auxiliary power connection terminal 22 and the other plug 32, 34 of power cord 30 is inserted into an auxiliary power input terminal 72 located on portable electronic device 70. Portable electronic device 70 includes two power input terminals, one for battery pack 10 and the other for external power that may be provided through a power cord. In particular, a first conductive connector 36 of one respective plug 32, 34 is inserted into connection port 28 of battery pack 10 and a second conductive connector 36 of the other respective plug 32, 34 is inserted into a corresponding connection port 28 of power input terminal 72 located on portable electronic device 70. At this point, battery pack 10 is capable of powering portable electronic device 70.

Figure 5:
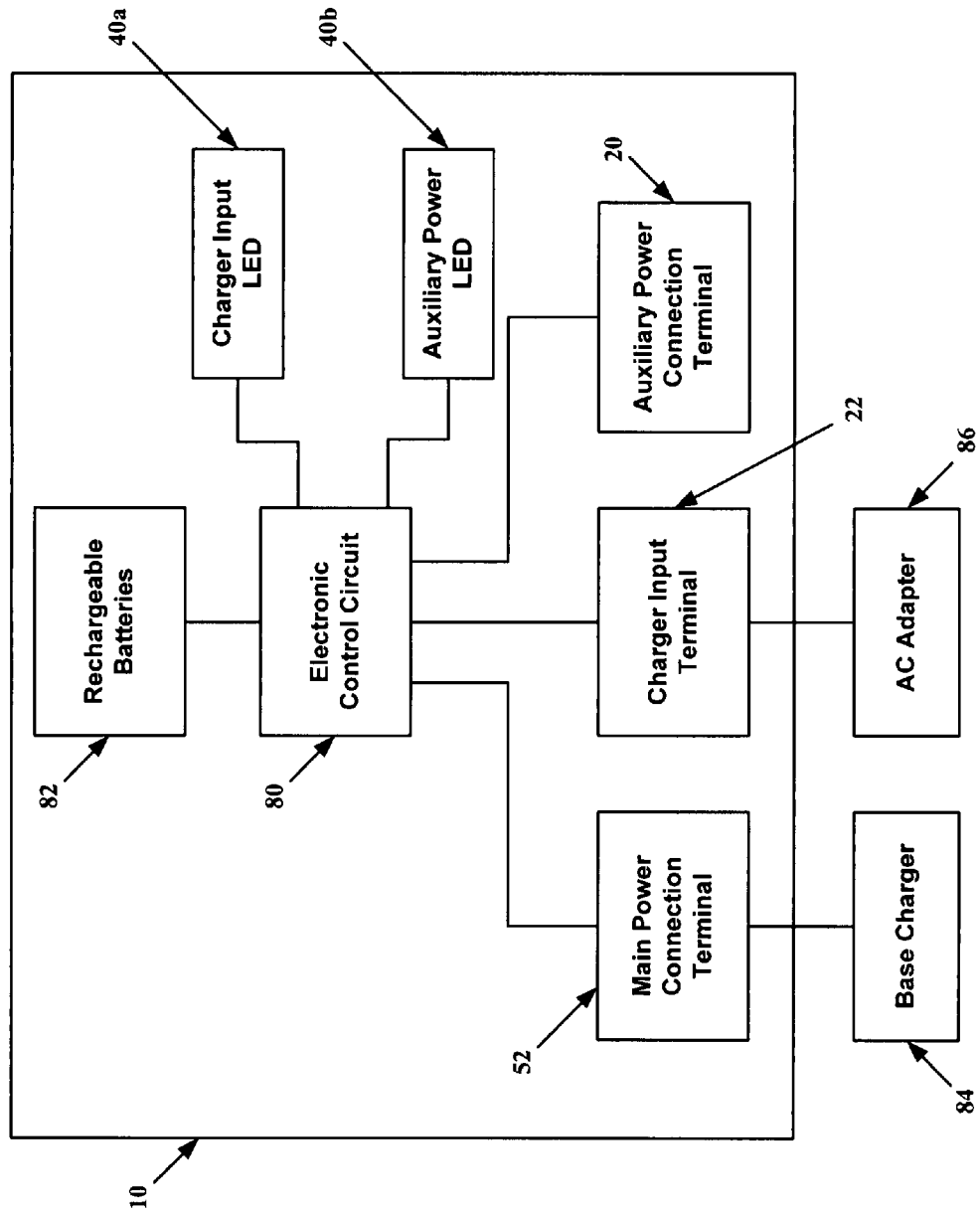
FIG. 5 is a block diagram of various components of the battery pack and accessories utilized in connection with the battery pack.

Referring to FIG. 5, a block diagram of certain components of battery pack 10 is illustrated as well as certain charging components that may be used to charge battery pack 10. Battery pack 10 includes an electronic control circuit 80 that controls various operations of battery pack 10. Electronic control circuit 80 may be a microprocessor based control unit, a specialized circuit including analog and digital circuitry, or a combination of both. At least one rechargeable battery 82 is connected with electronic control circuit 80 that is used to supply power to portable electronic device 70. Electronic control circuit 80 is responsible for monitoring and controlling such things as battery charge or power levels, the charging of rechargeable batteries 82, the provision of power to main power connection terminal 52, and the provision of power to auxiliary power connection terminal 22.

Electronic control circuit 80 is also connected with and controls indicators 40 associated with auxiliary power connection terminal 20 and charger input terminal 22. A charge indicator or LED 40a is illuminated or energized by electronic control circuit 80 while battery pack 10 is being charged and is turned off or de-energized by electronic control circuit 80 when battery pack 10 is fully charged. In addition, auxiliary power indicator or LED 40b is connected with and controlled by electronic control circuit 80. Auxiliary power indicator 40 is illuminated or energized while power is being provided from battery pack 10 through auxiliary power connection terminal 20, is de-energized when power is not being supplied through auxiliary power connection terminal 20, and is placed in a flashing state when battery pack 10 is supplying power to portable electronic device 70 through auxiliary power connection terminal 20 but rechargeable batteries 82 are in a low charge state, thereby indicating rechargeable batteries 82 need to be recharged.

Battery pack 10 is capable of being recharged using two separate techniques. First, battery pack 10 may be connected with a base charger 84 via main power connection terminal 52. Some portable electronic devices 70 come with base chargers 84 in which battery pack 10 can be connected when not connected to portable electronic device 70 to recharge rechargeable batteries 82. Electronic control circuit 80 monitors and controls the recharging process in one form of the present invention.

Another method of charging battery pack 10 involves the use of an AC adapter 86. Some portable electronic devices 70 come with adapters 86 that are capable of being connected to a standard wall outlet that provides 120V AC power. Adapter 86 may then be plugged into power input terminal 72 of portable electronic device 70 to provide power from the standard wall outlet, through power input terminal 72, to portable electronic device 70. In this form, adapter 86 is connected with charger input terminal 22 of battery pack 10. Adapter 86 includes a plug 32, 34 that has a conductive connector 36 that fits within connection port 28 of charger input terminal 22. As such, battery pack 10 is capable of being recharged directly from adapter 86 without the requirement of a separate base charger 84.

One form of the present invention discloses a battery pack for powering a portable electronic device, comprising: a battery casing containing at least one rechargeable battery, said battery casing including a loading surface on a first outer surface of said battery casing; an engagement mechanism associated with said loading surface for temporarily connecting said battery pack to said portable electronic device; a main power connection terminal associated with said loading surface capable of providing power to said first portable electronic device; and an auxiliary power connection terminal located on a second outer surface of said battery casing capable of receiving a plug from a power cord for powering said portable electronic device if said main power connection terminal is not capable of providing power to said portable electronic device.

Another form of the present invention discloses a method comprising: providing a rechargeable battery pack including an engagement surface configured to temporarily connect said rechargeable battery pack to an electronic device; connecting said rechargeable battery pack to said electronic device such that a first power connection terminal of said rechargeable battery pack engages a main power input terminal of said electronic device; attempting to power up said electronic device and if said electronic device does not power up, said method further comprising the steps of: connecting a first end of a power cord to an external power plug located on an outer surface of said rechargeable battery pack; and connecting a second end of said power cord to an auxiliary power input of said electronic device.

Another form discloses a method, comprising: connecting a rechargeable battery pack to a portable electronic device such that a main power terminal of said rechargeable battery pack engages a power input port of said portable electronic device; powering up said portable electronic device if said rechargeable battery pack is compatible with said portable electronic device and if said portable electronic device is not compatible with said portable electronic device said method further comprising the steps of: connecting a first end of a power cable to an external power output terminal located on an outer surface of said rechargeable battery pack; and connecting a second end of said power cable to an auxiliary power input terminal of said portable electronic device.

Yet another form discloses a battery pack for powering a portable electronic device, comprising: means for connecting said battery pack to said portable electronic device such that a main power terminal of said battery pack engages a main power input port of said portable electronic device; and an auxiliary power output terminal located on an outer surface of said portable electronic device capable of receiving a power cord for powering said portable electronic device through an auxiliary power input port located on said portable electronic device. The battery pack also includes a charger input terminal for receiving the power cord so that rechargeable batteries in the battery pack can be recharged.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A battery pack, comprising:
    a battery casing containing at least one rechargeable battery, said battery casing including a loading surface on a first outer surface of said battery casing;
    an engagement mechanism associated with said loading surface for temporarily connecting said battery pack to a portable electronic device;
    a main power connection terminal associated with said loading surface capable of providing power to said portable electronic device; and
    an auxiliary power connection terminal located on a second outer surface of said battery casing capable of receiving a plug from a power cord connected with said portable electronic device for powering said portable electronic device through said at least one rechargeable battery if said main power connection terminal is not capable of providing power to said portable electronic device.

2. The battery pack of claim 1, further comprising a charger input located on a respective outer surface of said battery casing capable of receiving said plug of said power cord for charging said at least one rechargeable battery.

3. The battery pack of claim 2, further comprising a cover covering said charger input, wherein said cover is operable to open to expose said charger input.

4. The battery pack of claim 2, further comprising a charge indicator exposed on a respective outer surface of said battery casing operable to indicate when said battery pack is being charged by a battery charger.

5. The battery pack of claim 4, wherein said charge indicator comprises a light emitting diode.

6. The battery pack of claim 4, further comprising an electronic control circuit connected with said at least one rechargeable battery for controlling said light emitting diode to indicate when said at least one rechargeable battery is fully charged.

7. The battery pack of claim 1, further comprising a cover covering said auxiliary power connection terminal, wherein said cover is operable to open to expose a connection port of said auxiliary power connection terminal.

8. The battery pack of claim 1, further comprising an indicator exposed on a respective outer surface of said battery casing for indicating use of said auxiliary power connection terminal.

9. The battery pack of claim 8, wherein said indicator comprises a light emitting diode.

10. The battery pack of claim 1, wherein said engagement member includes at least one locking tab and at least one guide recess for securing said battery device to a respective portable electronic device.

11. The battery pack of claim 1, wherein said power cord connects to a power input port located on said portable electronic device.

12. A method, comprising:
    providing a rechargeable battery pack including an engagement surface configured to temporarily connect said rechargeable battery pack to an electronic device;
    connecting said rechargeable battery pack to said electronic device such that a first power connection terminal of said rechargeable battery pack engages a main power input terminal of said electronic device;
    attempting to power up said electronic device and if said electronic device does not power up, said method further comprising the steps of:
        connecting a first end of a power cord to an external power plug located on an outer surface of said rechargeable battery pack; and
        connecting a second end of said power cord to an auxiliary power input of said electronic device.

13. The method of claim 12, further comprising the step of removing said first end of said power cord from said external power plug and removing said second end of said power cord from said auxiliary power input of said electronic device when said rechargeable battery pack runs out of power.

14. The method of claim 13, further comprising placing one respective end of said power cord in a charger input port located on an external surface of said rechargeable battery pack and placing a second respective end of said power cord in electrical connection with a power adapter to charge said rechargeable battery pack.

15. The method of claim 14, further comprising monitoring a charge indicator on said rechargeable battery pack to determine when said rechargeable battery pack is recharged.

16. A method, comprising:
    connecting a rechargeable battery pack to a portable electronic device such that a main power terminal of said rechargeable battery pack engages a power input port of said portable electronic device;

powering up said portable electronic device if said rechargeable battery pack is compatible with said portable electronic device and if said portable electronic device is not compatible with said portable electronic device said method further comprising the steps of:

connecting a first end of a power cable to an external power output terminal located on an outer surface of said rechargeable battery pack; and connecting a second end of said power cable to an auxiliary power input terminal of said portable electronic device.

17. A battery pack, comprising:

means for connecting said battery pack to a portable electronic device such that a main power terminal of said battery pack engages a main power input port of said portable electronic device; and an auxiliary power output terminal located on an outer surface of said battery pack capable of receiving a power cord for powering said portable electronic device through an auxiliary power input port located on said portable electronic device.

18. The battery pack of claim 17, further comprising a cover covering said auxiliary power output terminal.

19. The battery pack of claim 17, further comprising a power indicator located on a surface of said battery pack for indicating when power is being supplied through said auxiliary power output terminal.

20. The battery pack of claim 17, further comprising a charger input port located on an outer surface of said portable electronic device capable of receiving said power cord, wherein said power cord is connected with an adapter of said portable electronic device to recharge at least one rechargeable battery in said battery pack.

21. The battery pack of claim 20, further comprising a charge indicator located on an outer surface of said battery pack for indicating when said battery pack is being charged by said adapter.

* * * * *